United States Patent
Schaefer et al.

(10) Patent No.: US 9,791,345 B2
(45) Date of Patent: *Oct. 17, 2017

(54) PIPELINE LEAK LOCATION USING ULTRASONIC FLOWMETERS

(71) Applicant: SIEMENS AKTIENGESELLSCHAFT, München (DE)

(72) Inventors: Robert Schaefer, Northport, NY (US); Dennis J. Diorio, Kings Park, NY (US); James M. Doorhy, Manorville, NY (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 552 days.

This patent is subject to a terminal disclaimer.

(21) Appl. No.: 14/445,837

(22) Filed: Jul. 29, 2014

(65) Prior Publication Data

US 2014/0331745 A1 Nov. 13, 2014

Related U.S. Application Data

(62) Division of application No. 12/894,619, filed on Sep. 30, 2010, now Pat. No. 8,850,871.

(51) Int. Cl.
    *G01M 3/24* (2006.01)
    *G01M 3/28* (2006.01)

(52) U.S. Cl.
    CPC .......... *G01M 3/243* (2013.01); *G01M 3/2807* (2013.01)

(58) Field of Classification Search
    CPC ............................ G01M 3/243; G01M 3/2807

USPC .............................................. 73/40.5 A, 49.1
See application file for complete search history.

(56) References Cited

U.S. PATENT DOCUMENTS

| | | |
|---|---|---|
| 3,987,662 A | 10/1976 | Hara et al. |
| 4,083,229 A | 4/1978 | Anway |
| 4,856,321 A | 8/1989 | Smalling et al. |
| 5,272,646 A | 12/1993 | Farmer |
| 5,437,194 A | 8/1995 | Lynnworth |
| 5,548,530 A | 8/1996 | Baumoel |
| 6,381,549 B1 | 4/2002 | Smith |
| 6,442,999 B1 | 9/2002 | Baumoel |
| 6,970,808 B2 | 11/2005 | Abhulimen et al. |
| 7,027,936 B2 | 4/2006 | Ploug-Soerensen et al. |
| 2005/0246112 A1 | 11/2005 | Abhulimen et al. |

FOREIGN PATENT DOCUMENTS

| | | |
|---|---|---|
| FR | 2895508 A1 | 6/2007 |
| GB | 2289760 A | 11/1995 |
| WO | 2008016697 A2 | 2/2008 |
| WO | 2009132865 A1 | 11/2009 |

*Primary Examiner* — Daniel S Larkin

(57) ABSTRACT

Fluid leaks are identified and located by successively monitoring changes in fluid flow and sound velocities of fluid at a plurality of locations in the pipe with flow meters, such as with ultrasonic flow meters. Preferably the successive monitoring sampling rates are sufficiently high to measure instantaneous velocity changes. A controller coupled to the meters associates changes in monitored fluid flow and sound velocities in two locations along the pipe with a leak event occurring between those locations. The controller identifies the association event at each location and correlates pipe leak location based at least in part on difference in time between the respective location events. The method may be used in liquid and gas pipeline transmission systems.

10 Claims, 3 Drawing Sheets

PIPELINE LEAK LOCATION USING ULTRASONIC FLOWMETERS

CROSS REFERENCE TO RELATED APPLICATIONS

This is a divisional application of application Ser. No. 12/894,619, filed Sep. 30, 2010, now U.S. Pat. No. 8,850,871, and claims the benefit thereof. The entire contents and substance of the prior application is hereby incorporated by reference.

BACKGROUND OF THE DISCLOSURE

1. Field of the Invention

The invention relates to pipe leak detection and location systems and methods. Exemplary applications are suitable for leak detection and location in oil, natural gas and other pipelines that transport gaseous or liquid fluids over long geographic distances.

2. Description of the Prior Art

In order to implement environmental, health and safety policies, pipeline owners and operators monitor pipelines for leaks. When a leak is identified, the leaking pipe segment must be located, isolated and repaired as quickly as possible, so as to minimize loss of material and potential environmental infiltration. Often pipelines are routed through remote geographic areas or buried underground or beneath waterways, making external visual inspection difficult or impossible. In the past various remote leak detection and location methods have been employed to satisfy pipeline monitoring needs.

As shown in FIGS. 1A-1C, when pipes 10 experience a leak 12, the leak event causes upstream and downstream pressure wave disturbances 14 that propagate at the fluid's sound velocity C, also notated as $V_s$ in technical literature. The pressure wave disturbance 14 is caused by sudden loss of pressure at the leak site, and travels upstream and downstream. As a pressure wave propagates through a given fluid volume, it alters the fluid's local density, thus modifying as a function of time the local sound velocity as well as the fluid flow velocity $V_f$.

The assignee of the present application and its predecessor companies have developed, patented and sold leak monitoring and detection systems utilizing ultrasonic flow meters oriented at selected monitoring locations ("Loc") along a pipeline. As shown and described in U.S. Pat. Nos. 5,548,530 and 6,442,999, the entire contents of each being incorporated herein by reference, ultrasonic meters at each location periodically monitor, measure and record sound velocity C with a time stamp that is forwarded to a central station controller. The time clock at each location is periodically synchronized in cooperation with the controller, so that C measurements at each location can be compared and analyzed by the controller with a common time reference line. As a leak pressure wave disturbance anomaly propagates through the pipeline, upstream and downstream monitoring locations will experience localized variations in C caused by the disturbance at different times generally correlating to distance L from the disturbance. The controller identifies monitoring locations bracketing each side of the leak and then extrapolates the leak location based at least in part on difference in time between when each of the monitoring locations identified the leak event causation of sound velocity C change.

As noted in U.S. Pat. Nos. 5,548,530 and 6,442,999, ultrasonic flow meters are non-intrusive and do not have to be installed inside a pipe, as must be done with intrusive pressure transducers or mechanical flow rate transducers, such as in U.S. Pat. No. 5,272,646. Non-intrusive metering does not require pipe wall penetration, preserving pipe integrity, and lowering initial or retrofit installation costs.

Generally the ultrasonic flow meter leak detection and location methods and systems shown in U.S. Pat. Nos. 5,548,530 and 6,442,999 enable rapid identification and location of leaks within several hundred feet (100 meters) of location error between monitoring locations spanning distances of up to approximately 50 miles (75 kilometers). However in some applications leak identification and location solely based on monitoring change in sound velocity C is difficult because of the leak propagation disturbance wave attenuation, as shown in FIGS. 1A-1C.

In FIG. 1A, pipe 10 discharges into an atmospheric pressure tank 16. The localized line pressure at LocB is too low for strong propagation of the leak wave 14, so that there may be an insignificantly measurable variation in sound velocity $C_B$. Thus, while LocA may measure a sound velocity variation $C_A$, the location of the leak 12 between LocA and LocB is not as reliably extrapolated within a low desired error probability as can be done between monitoring locations having higher localized pressures.

In FIG. 1B the relative distance between leak 12 and monitoring location LocD is very large. Leak disturbance wave 14 propagation attenuation makes it more difficult to identify a leak event at LocD, especially for fluids having low density, e.g., low pressure gas transmission. A practical solution may be to reduce the distance between monitoring locations at the cost of additional meter installations, maintenance and monitoring. It is desirable to maximize rather than reduce distance between monitoring locations.

FIG. 1C is another exemplary challenge to accurate sound velocity monitoring in lower density or pressure fluids. In FIG. 1C pipeline 10 is serially transporting a relatively high density FLUID 1 ahead of an upstream lower density FLUID 2, with a known buffer fluid separating the two fluid streams. Leak 12 erupts within the FLUID 1 stream and generates leak propagation disturbance 14, monitored and identified at LocF as a change in $C_F$. However, the upstream propagation wave 14 detected as a change in $C_E$ at LocE is traveling through less dense FLUID 2. Depending on the degree of upstream leak disturbance attenuation, it may be more difficult to identify that leak disturbance event at LocE, and differences in transmission propagation speed in FLUID 2 compared to FLUID 1 will make it more difficult to extrapolate to desired accuracy the location of leak 12 at the proper distances $L_E$ and $L_F$.

Leak disturbances also alter localized flow velocity $V_f$, generally increasing upstream velocity and lowering downstream velocity, due to lower pumping resistance at the leak site. In U.S. Pat. No. 5,272,646 it is stated that both pressure and flow rate through an invasive differential pressure meter can be monitored at plural locations to locate a pipeline leak. It also has been observed by the present inventors that localized flow velocity $V_f$ changes caused by leak pressure wave disturbances are identifiable when localized pressure at a measurement location is low or at greater distances from the leak location, compared to what can be identified by change in sound velocity C alone. They have noted that monitoring of both change in sound velocity and fluid flow velocity increased leak identification and location confidence. The leak disturbance may be identified by change in sound velocity or change in flow velocity. Contemporaneous identification and corroboration by both measurement modalities greatly increases identification and location confidence. However, known flow velocity meters require intrusion into the pipe.

Thus, a need exists in the art for a pipe leak detection and location system and method that utilizes non-intrusive instrumentation located outside of the pipe.

Another need exists in the art for a pipe leak detection system and method that monitors changes in fluid flow and sonic velocities, at plural locations in the pipe, and that associates changes in either with a leak event between two of the monitored locations.

Yet another need exists in the art for a pipe leak detection and location system and method that monitors changes in fluid flow and sonic velocities, at plural locations in the pipe that associates changes in either with a leak event between two of the monitored locations and further enables precise leak location identification.

SUMMARY OF THE INVENTION

Accordingly, an object of the present invention is to create a pipe leak detection and location system and method that utilize non-intrusive instrumentation located outside of the pipe, with higher leak detection reliability than previously known systems.

Another object of the present invention is to create a pipe leak detection system and method that monitors changes in fluid flow and sound velocities, at plural locations in the pipe, and that associates changes in either with a leak event between two of the monitored locations.

Yet another object of the present invention is to create a pipe leak detection and location system and method that monitor changes in fluid flow and sonic velocities, at plural locations in the pipe, that associates changes in either with a leak event between two of the monitored locations and also enables precise leak location identification.

These and other objects are achieved in accordance with the present invention by the leak detection and location systems and methods of the present invention that monitor changes in fluid flow and sonic velocities of fluid at a plurality of locations along a pipe. Changes in monitored fluid flow and sonic velocities in any two locations are associated with a leak event occurring between them. The event time at each of the two locations is noted. The leak location is determined by using difference in time between the events at each of the respective locations to correlate where the leak would have to be located in order for the leak disturbance propagation wave to reach each of the monitoring locations at their respective recorded event times.

One aspect of the present invention is directed to a method for fluid leak detection in a pipe featuring successively monitoring changes in fluid flow and sonic velocities of fluid at a plurality of locations along the pipe with flow meters. Changes in monitored fluid flow and sonic velocities in two locations along the pipe are associated with a leak event occurring between those locations by a controller coupled to the flow meters. The controller identifies time of the respective association of event sampled at the two locations. Furthermore, the leak position on the pipe can be correlated at least in part on difference in time between the respective location events, so that it can be determined where the leak event must have originated in order for the leak disturbance propagation wave to reach each of the monitoring locations at their respective recorded event times.

Another aspect of the present invention is directed to a pipe leak detection and location system, featuring a plurality of pairs of fluid flow and a sound velocity meters at a plurality of locations along the pipe. Each meter pair successively monitors respective changes in fluid flow and sonic velocities of fluid in the pipe. A controller is coupled to the meter pairs. The controller associates changes in fluid flow and sonic velocities monitored by the meter pairs at two locations along the pipe with a leak event occurring between those locations. The controller identifies the respective association of event sampled at the two locations. The controller then correlates pipe leak location based at least in part on difference in time between the respective location events, so that it can be determined where the leak event must have originated in order for the leak disturbance propagation wave to reach each of the monitoring locations at their respective recorded event times.

The meter pairs at each monitoring location are preferably non-intrusively coupled to the pipe exterior. An ultrasonic flow meter may be used to perform both sound velocity and fluid flow velocity monitoring. The flow meters may collect monitoring samples and periodically send batches of samples to the controller for monitoring analysis.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in pipe leak detection and location systems. An exemplary embodiment of the present invention is shown in FIGS. 2 and 3.

General Description of System Architecture

Figure 2:
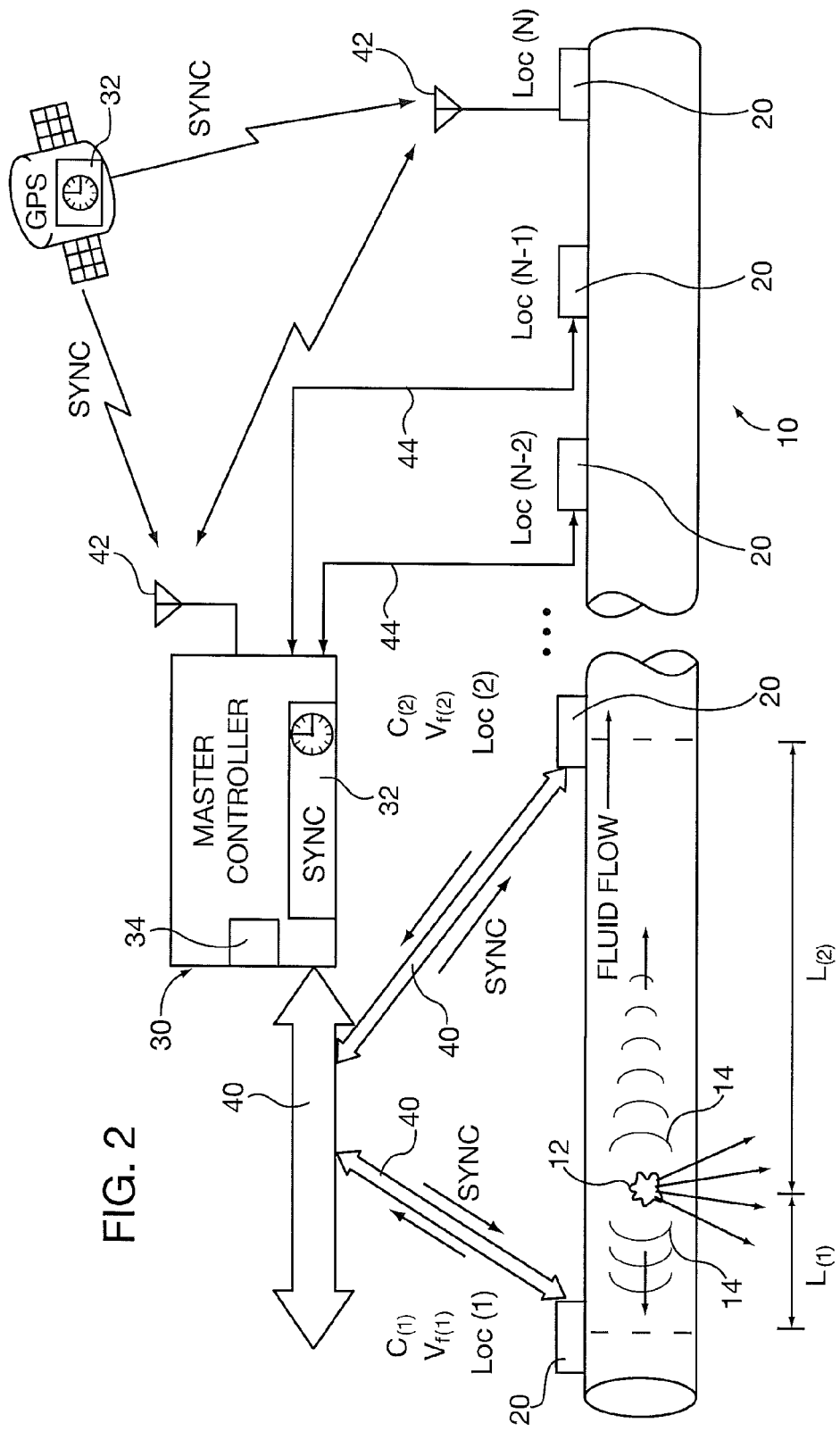
FIG. 2 is a schematic elevational view of an exemplary pipeline having the pipe leak detection and location system of the present invention.
Figure 3:
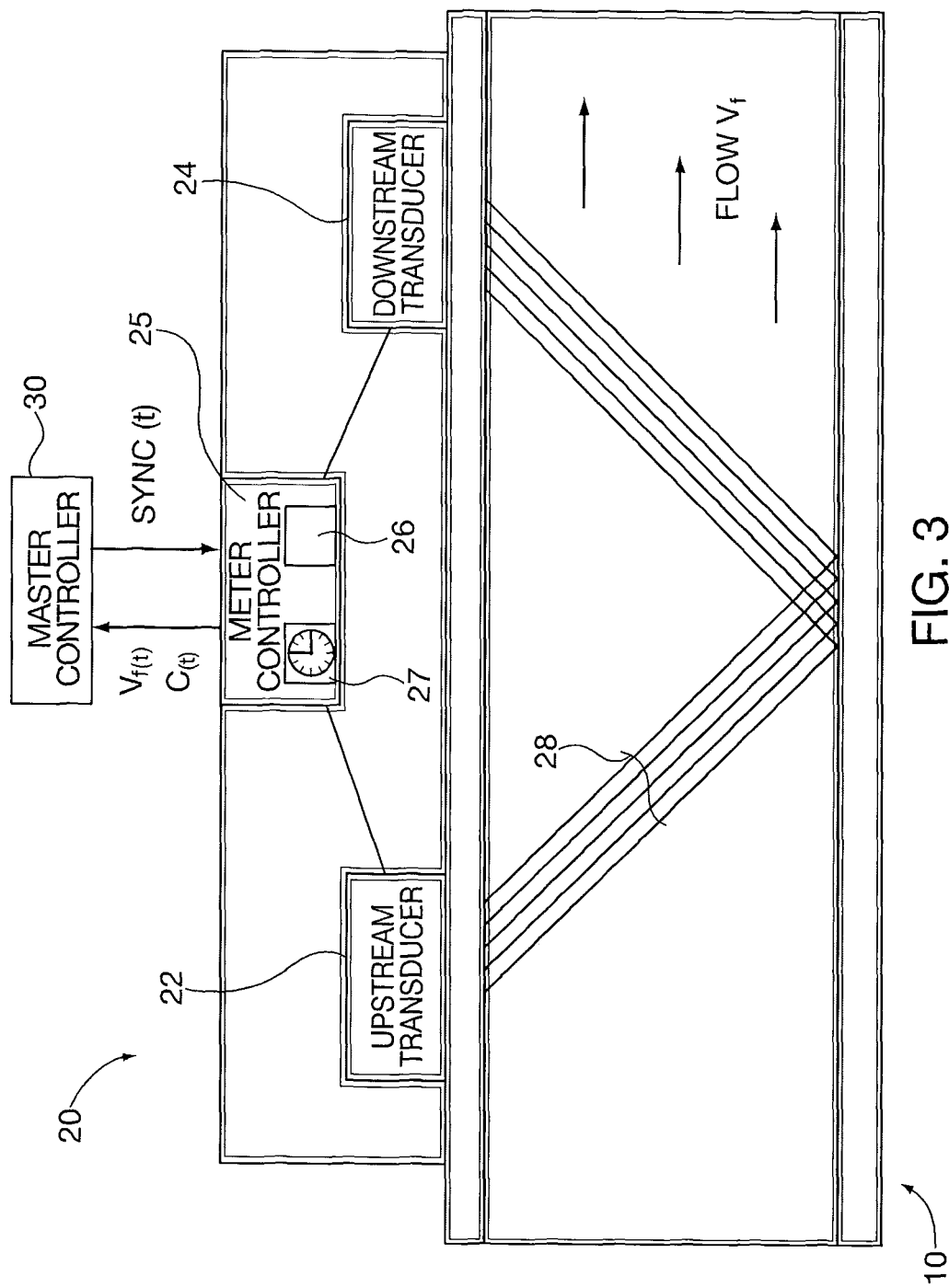
FIG. 3 is a schematic elevational view of a fluid flow monitoring station of the present invention.

FIG. 2 shows pipe 10 having an array of flow meters 20 arrayed along its length as far apart as up to 100 miles (148 kilometers). Referring to FIG. 3, each flow meter 20 is a non-invasive ultrasonic flow meter of known construction and operation coupled to the pipe 10 exterior. An exemplary ultrasonic flow meter is a Model 7ME3600 sold in the United States of America by Siemens Industry Solutions, Inc. The flow meter 20 has an upstream transducer 22 and a downstream transducer 24 that are physically separated a known distance and coupled to a meter controller 25 that includes software stored in memory 26 and a clock 27, which is preferably a real time clock. The meter controller 25, implementing the software stored in memory 26, causes the upstream transducer 22 to send an ultrasonic signal 28 through fluid in the pipe 10 at a sampling rate established with the clock 27. The reflected signal from upstream transducer 22 is detected by the downstream transducer 24. The direction is then reversed such that the downstream transducer sends an ultrasonic signal to the upstream transducer. As is known by those skilled in the art, the time difference between each direction of transmission and the average time delay from transmission to receipt of the ultrasonic signal can be correlated to both sound velocity C and flow velocity $V_f$ of the fluid in the meter.

The meter controller 25 gathers samples of both sound velocity C and fluid flow velocity $V_f$ and records time t of each sample. Preferably samples are taken at a 1 to 50 millisecond update rate for high resolution. The high sampling rate effectively enables the meter 20 to determine the instantaneous change in fluid flow velocity ($dV_f/dt$) and sound velocity (dC/dt) in the fluid. Real time samples may be collected in the meter controller 25 in batches and periodically transmitted to master controller 30 at a slower transmission rate; for example of the order of one batch per minute. If desired, the sample batches can be compressed prior to transmission to the master controller 30 using known data compression techniques. The master controller subsequently decompresses the received sample batches for further analysis and processing. Data processing and analysis tasks can be divided between the meter controller 25 and master controller 30 at the discretion of one skilled in the art. Concentration of processing tasks in the master controller 30 may reduce manufacture and maintenance costs.

Master Controller 30 is of known construction. An exemplary master controller is a Model 10LD sold in the United States of America by Siemens Industry Solutions, Inc. Master controller 30 is communicatively coupled to each meter controller 25 in the respective meters 20 arrayed along the pipeline at designated locations Loc(1), Loc(2) . . . Loc(N) in FIG. 2. Any known communications coupling pathway may be utilized between the respective controllers 25, 30, including by way of example bi-directional data busses 40, hard wired lines 44 (including carrier signals over power lines, fiberoptic, coaxial or metallic communications cable, etc.) or wireless communication via antennae 42.

The master controller 30 includes a synchronization clock 32, which is preferably a real time clock, and software stored in memory 34. The master controller 30, implementing the software stored in memory 34, receives time-stamped sound and fluid flow velocities data from each of the meters 20 at locations Loc(1)-Loc(N). The master controller 30 periodically sends clock synchronization signals from the synchronization clock 32 to the respective meter clocks 27 at each meter 20 location Loc, so that time samples from each meter 20 have a common frame of reference. If desired, meter clocks 27 and/or master controller synchronization clock 32 may be synchronized by global positioning system (GPS) synchronization clock 32.

General Description of Leak Location

Referencing FIG. 2, as previously noted herein, a leak event caused at leak 12 within the pipe 10 causes upstream and downstream pressure wave disturbances 14 that propagate at the fluid's sound velocity C. As a pressure wave propagates through a given fluid volume, it alters the fluid's local density, thus modifying over time the local sound velocity C, as well as the fluid flow velocity $V_f$. The master controller 30 associates changes in sound and fluid flow velocities samples captured by the meters 20 with a leak 12 event, and notes the time of each event at the respective meters 20. Based on the leak pressure wave propagation characteristics in the pipe 10, the leak event may be detected by instantaneous change in either sound or fluid flow velocities or both. The master controller 30 correlates the difference in event time at the two meter locations $Loc_{(1)}$ and $Loc_{(2)}$ closest to the leak (i.e., the shortest time difference upstream and downstream of leak 12) with travel distances $L_{(1)}$ and $L_{(2)}$, such as by the exemplary methods disclosed in U.S. Pat. Nos. 5,453,944 and 6,442,999.

Figure 1A:
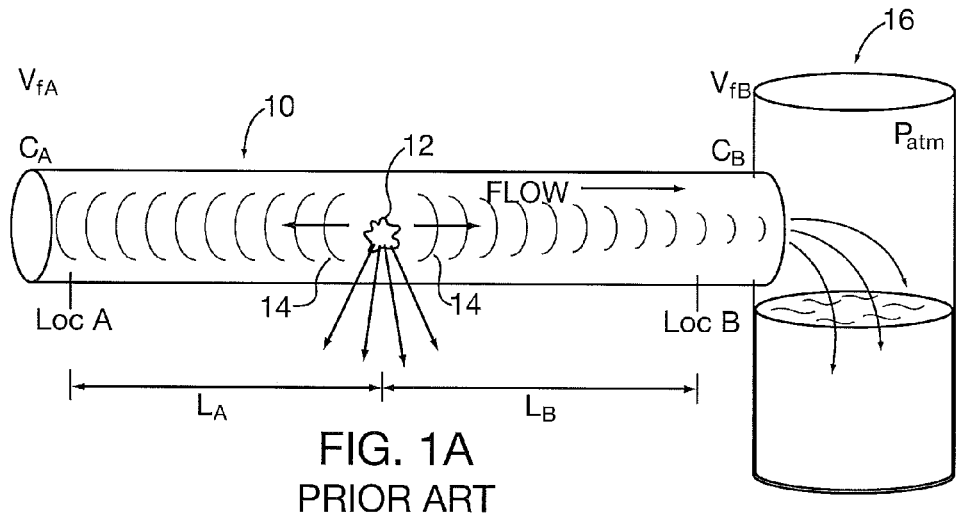
FIG. 1A is a schematic view of an exemplary pipeline discharging into an atmospheric pressure tank, with a leak monitoring location proximal the tank.
Figure 1B:
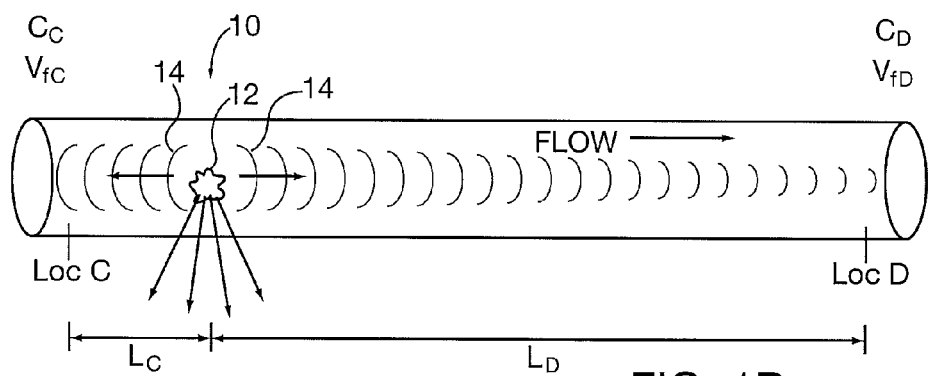
FIG. 1B is a schematic view of an exemplary pipeline with a relatively long distance between leak monitoring locations.
Figure 1C:
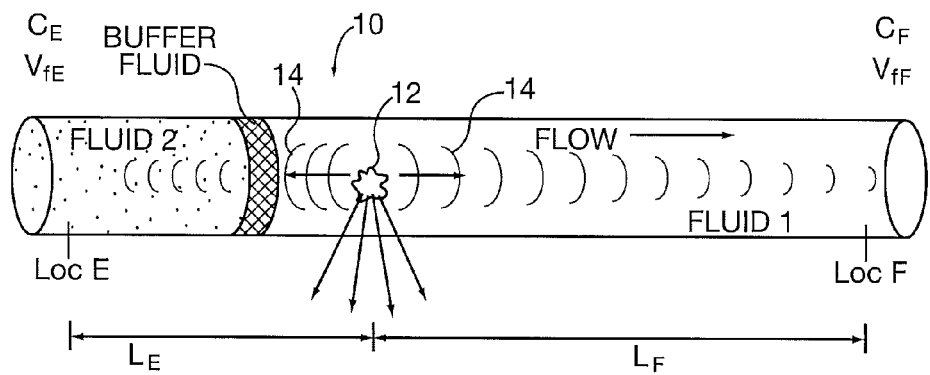
FIG. 1C is a schematic view of an exemplary pipeline transporting different fluids in serial batches.

The master controller 30 preferably utilizes sound velocity C and flow velocity $V_f$ samples from each respective meter 20 location Loc to identify and track series of different fluid feeds through the pipeline 10. Using the example of FIG. 1C, the controller 30 associates passage of FLUID1 through the pipeline based on correlation of sound velocity C characteristics with different types of fluids. When LocE and upstream meter locations detected a drop in C with the passage of FLUID2, the controller 30 modifies its analysis of pulsation wave 14 propagation characteristics to compensate for the different physical characteristics of FLUID2.

As one skilled in the art can appreciate, specific applications of the present invention may dictate need for enhanced analysis of respective change of velocities samples with known statistical data processing techniques, in order to reduce likelihood of false leak detections caused by spurious or transient velocity fluctuations. For example, the master controller 30 may be programmed to require that a flow or sound velocity fluctuation exist for a minimum number of consecutive samples, or that windows of samples be averaged repetitively before the fluctuation is associated with a leak event. Similarly, the controller 30 may be programmed to ignore a known pulsation pattern in the pipeline caused by another device (e.g., valve closing or pump operation).

Although various embodiments which incorporate the teachings of the present invention have been shown and described in detail herein, those skilled in the art can readily devise many other varied embodiments that still incorporate these teachings.

What is claimed is:

1. A method for fluid leak detection in a pipe, comprising:
    successively monitoring changes in fluid flow and sound velocities of fluid at a plurality of locations in the pipe, with pairs of flow meters, each pair comprising a meter controller;
    associating changes in monitored fluid flow and sound velocities in two locations along the pipe, with a leak event occurring between the two locations, with a master controller coupled to the meter controllers of the pairs of flow meters; and
    identifying the respective association of event sampled at the two locations, with the master controller,
    wherein each meter controller gathers samples of both sound velocity and fluid flow velocity, records time of each sample and periodically transmits batches of samples to the master controller, and
    wherein the master controller receives time-stamped fluid flow and sound velocities data from each meter controller of the meter pairs and associates changes in the time-stamped fluid flow and sound velocities data with the leak event.

2. The method of claim 1, wherein the fluid flow and sound velocities monitoring is performed at each location with pairs of meters that are non-intrusively coupled to the pipe exterior.

3. The method of claim 2, wherein the respective pairs of meters are an ultrasonic meter capable of monitoring both flow and sound velocities.

4. The method of claim 1, wherein a time of each identified leak location event is communicated to the master controller, and time clocks at each location are synchronized.

5. A method for fluid leak detection and location in a pipe, comprising:
- successively monitoring changes in fluid flow and sound velocities of fluid at a plurality of locations in the pipe, with pairs of flow meters, each pair comprising a meter controller, wherein each meter controller gathers samples of both sound velocity and fluid flow velocity and records time of each sample;
- receiving, by a master controller, time-stamped fluid flow and sound velocities data from each meter controller of the pairs of flow meters;
- associating changes in monitored fluid flow and sound velocities data gathered by the meter controllers of two adjacent pairs of low meters in two locations along the pipe with a leak event occurring between the two locations, by the master controller coupled to the meter controllers of the pairs of flow meters; and
- determining, by the master controller, a location of the leak event by correlating differences in sample time between the two adjacent meter pairs, based upon a shortest time difference upstream and downstream of the leak event, with the changes in the fluid flow and sound velocities data of the two adjacent meter pairs.

6. The method of claim 5, wherein the fluid flow and sound velocity monitoring is performed at each location with pairs of meters that are non-intrusively coupled to the pipe exterior.

7. The method of claim 6, wherein the respective pairs of meters are ultrasonic meters capable of monitoring both flow and sound velocity.

8. The method of claim 5, wherein a plurality of respective velocity samples are collected by the flow meters and periodically sent to the master controller.

9. The method of claim 5, wherein a time of each identified location leak event is communicated to the master controller and time clocks at each location are synchronized.

10. The method of claim 5, wherein the successive monitoring of changes of sound and fluid flow velocities at plural locations comprises monitoring of instantaneous changes in velocities at a sampling update rate of 1 to 50 milliseconds with the respective flow meters.

* * * * *